US010169806B1

(12) United States Patent
Golwalkar (10) Patent No.: US 10,169,806 B1
(45) Date of Patent: Jan. 1, 2019

(54) SHARED AGGREGATED E-COMMERCE SHOPPING CART

(71) Applicant: Amazon Technologies, Inc., Reno, NV (US)

(72) Inventor: Yogesh Vilas Golwalkar, Andhra Pradesh (IN)

(73) Assignee: Amazon Technologies, Inc., Seattle, WA (US)

( * ) Notice: Subject to any disclaimer, the term of this patent is extended or adjusted under 35 U.S.C. 154(b) by 263 days.

(21) Appl. No.: 13/766,129

(22) Filed: Feb. 13, 2013

(51) Int. Cl.
*G06Q 30/06* (2012.01)

(52) U.S. Cl.
CPC ............................ *G06Q 30/0633* (2013.01)

(58) Field of Classification Search
USPC ............... 705/26.1, 26.2, 26.25, 26.3, 26.4, 705/26.41–26.44, 26.5, 26.61–26.64, 26.7, 705/26.8, 26.81, 26.82, 26.9, 27.1, 27.2
See application file for complete search history.

(56) References Cited

U.S. PATENT DOCUMENTS

| | | | | |
|---|---|---|---|---|
| 6,873,968 | B2* | 3/2005 | Ehrlich et al. | 705/80 |
| 6,876,977 | B1* | 4/2005 | Marks | 705/26.62 |
| 6,912,507 | B1* | 6/2005 | Phillips et al. | 705/7.13 |
| 7,356,490 | B1* | 4/2008 | Jacobi et al. | 705/26.8 |
| 7,364,070 | B2* | 4/2008 | Chang | 235/383 |
| 7,620,404 | B2* | 11/2009 | Chesnais et al. | 455/456.1 |
| 7,647,247 | B2* | 1/2010 | Abraham et al. | 705/26.2 |
| 7,970,661 | B1* | 6/2011 | Abraham et al. | 705/26.1 |
| 8,418,919 | B1* | 4/2013 | Beyda | 235/383 |
| 2002/0113123 | A1* | 8/2002 | Otto et al. | 235/381 |
| 2005/0096997 | A1* | 5/2005 | Jain et al. | 705/26 |
| 2007/0208802 | A1* | 9/2007 | Barman et al. | 709/203 |
| 2007/0271147 | A1* | 11/2007 | Crespo et al. | 705/26 |
| 2008/0040240 | A1* | 2/2008 | Covington et al. | 705/27 |
| 2008/0046331 | A1* | 2/2008 | Rand | 705/26 |
| 2011/0178889 | A1* | 7/2011 | Abraham et al. | 705/26.1 |
| 2012/0185355 | A1* | 7/2012 | Kilroy | 705/26.8 |

(Continued)

FOREIGN PATENT DOCUMENTS

EP  1170690 A1 * 1/2002 ............ G06F 17/60

OTHER PUBLICATIONS

Zhu et al., "Let's Shop Online Together: An Empirical Investigation of Collaborative Online Shopping Support," Information Systems Research vol. 21, No. 4, Dec. 2010, pp. 872-891 (Year: 2010).*

*Primary Examiner* — Kathleen Palavecino
*Assistant Examiner* — Lance Y Cai
(74) *Attorney, Agent, or Firm* — Thomas | Horstemeyer, LLP (57) ABSTRACT

Disclosed are various embodiments for a shopping cart component of an electronic commerce application. The shopping cart may be shared by one or more users of the electronic commerce application. In this respect, the shopping cart represents the aggregate purchase of items on behalf of multiple users of the electronic commerce application. Each user with access to the shopping cart may add to or remove items from the shopping cart or purchase some or all of the items within the shopping cart. Further, each user may share the shopping cart with other users of the electronic commerce application. Discounts or other promotional or marketing credits or benefits may also be added to and shared by all users with access to the shopping cart.

20 Claims, 9 Drawing Sheets

(56) References Cited

U.S. PATENT DOCUMENTS

| 2012/0197753 A1* | 8/2012 | Kalin .......................... 705/26.8 |
| 2012/0226588 A1* | 9/2012 | Wuhrer et al. ............... 705/27.1 |
| 2012/0253972 A1* | 10/2012 | Oskolkov et al. ........... 705/26.8 |
| 2013/0211953 A1* | 8/2013 | Abraham et al. ............ 705/26.8 |

* cited by examiner

SHARED AGGREGATED E-COMMERCE SHOPPING CART

BACKGROUND

Online or electronic merchants have traditionally supplied customers with electronic shopping carts allowing individual customers to purchase multiple items. These electronic shopping carts are often linked to individual users or individual user accounts. Users may add items they wish to purchase their shopping cart, purchase items in their shopping cart, and save their shopping cart in order to purchase items at a later time.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to aggregating the purchases of multiple items from multiple users into a single shopping cart accessible by multiple user accounts. The shopping cart is initially created by a single user and access to the cart is then shared with other users of an electronic commerce application or electronic commerce site. Any user with whom the shopping cart has been shared may add items to or remove items from the shopping cart. Users with whom the shopping cart has been shared may also choose to share the shopping cart with additional users. In some embodiments of the present disclosure, the user creating the shopping cart may set permissions or create rules defining what actions users may or may not take with respect to the shopping cart. In some particular embodiments, the permissions may be set on a per user or per item basis.

As additional users gain access to and add items to the shopping cart, the shared shopping cart comes to represent the aggregated purchase of items for multiple users. Alternatively, the shopping cart may embody the purchase of items by one person on behalf of another. In the following discussion, a general description of the system and its components is provided, followed by a discussion of the operation of the same.

Figure 1:
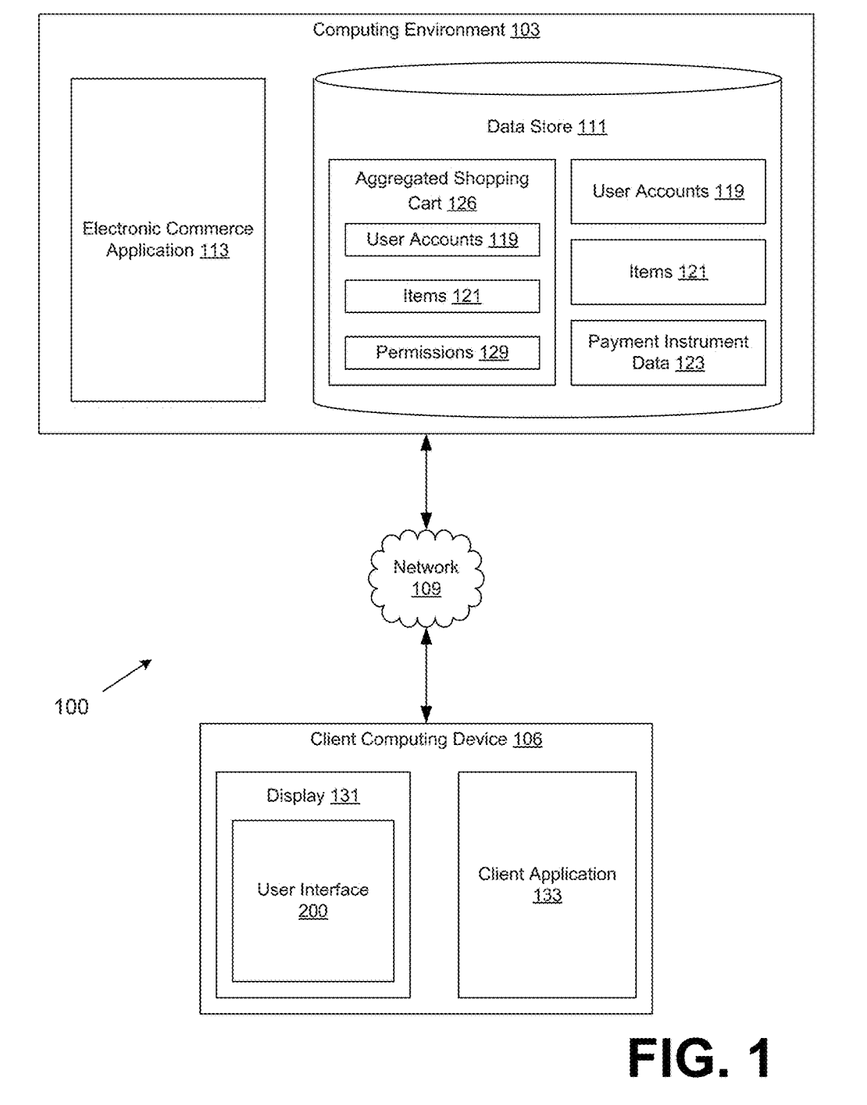
FIG. 1 is a drawing of a networked environment according to various embodiments of the present disclosure.

With reference to FIG. 1, shown is a networked environment 100 according to various embodiments. The networked environment 100 includes a computing environment 103 and a client computing device 106, which are in data communication with each other via a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may employ a plurality of computing devices that may be employed that are arranged, for example, in one or more server banks or computer banks or other arrangements. Such computing devices may be located in a single installation or may be distributed among many different geographical locations. For example, the computing environment 103 may include a plurality of computing devices that together may comprise a cloud computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 111 that is accessible to the computing environment 103. The data store 111 may be representative of a plurality of data stores 111 as can be appreciated. The data stored in the data store 111, for example, is associated with the operation of the various applications and/or functional entities described below.

The components executed on the computing environment 103, for example, include an electronic commerce application 113 and other applications, services, processes, systems, engines, or functionality not discussed in detail herein. The electronic commerce application 113 is executed in order to facilitate the online purchase of items 121 over the network 109. The electronic commerce application 113 also performs various backend functions associated with the online presence of a merchant in order to facilitate the online purchase of items 121 as will be described. For example, the electronic commerce application 113 generates network pages such as web pages or other types of network content that are provided to client computing devices 106 for the purposes of selecting items 121 for purchase, rental, download, lease, or other form of consumption as will be described.

The data stored in the data store 111 includes, for example, user accounts 119, items 121, payment data 123, aggregated shopping carts 126 comprising items 121 and permissions 129 in association with user accounts 119. The data store 111 may also potentially comprise other data.

User accounts 119 may include a user name, an account password, shipping addresses, user preferences, and other such data. While user accounts 119 often have a one-to-one correspondence with a single person, it is possible for a user account 119 to represent a one-to-many relationship. For example, user accounts may be shared by members of a family, where spouses have access to each other's user accounts or children are able to access a parent's user account.

Items 121 may comprise data associated with each item. Such data includes the type, price, quantity, description, ratings, reviews and other such data.

Payment instrument data 123 represents payment instruments accepted for purchase of items within an aggregated shopping cart. Such data includes the type of instrument, such as store credit, credit card data, debit card data, and other forms of electronic payment instruments. Payment instrument data 123 is generally linked to user accounts 119 and to aggregated shopping carts 126. The link between payment instrument data 123 and user accounts 119 represents the type of payments a user associated with a user account 119 may make. The link between payment instrument data 123 and aggregated shopping carts 126 represents how items within an aggregated shopping cart will be purchased. It is understood that one or more payment instruments may be linked to a single user account 119 or a single aggregated shopping cart 126.

Aggregated shopping carts 126 may comprise shopping cart data such as items 121 added to the shopping cart. Aggregated shopping carts 126 may further be associated with user accounts 119 that have access to the aggregated shopping cart 126. In addition, aggregated shopping carts 126 may have permissions 129 limiting the actions that users associated with certain user accounts 119 or classes of user accounts 119 may take with respect to the aggregated shopping cart 126.

The client computing device 106 is representative of a plurality of client devices that may be coupled to the network 109. The client computing device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client computing device 106 may include a display 131. The display 131 may comprise, for example, one or more devices such as liquid crystal display (LCD) displays, gas plasma-based flat panel displays, organic light emitting diode (OLED) displays, LCD projectors, or other types of display devices, etc.

The client computing device 106 may be configured to execute various applications such as a client application 133 and/or other applications. The client application 133 may be executed in a client computing device 106, for example, to access network content served up by the computing environment 103 and/or other servers, thereby rendering a user interface 200 on the display 131. To this end, the client application 133 may comprise, for example, a browser, a dedicated application, etc., and the user interface 200 may comprise a network page, an application screen, etc. The client computing device 106 may be configured to execute applications beyond the client application 133 such as, for example, email applications, social networking applications, word processors, spreadsheets, and/or other applications.

Next, a general description of the operation of the various components of the networked environment 100 is provided. To begin, the client computing device 106 sends a request across the network 109 to the electronic commerce application 113 executing within the computing environment 103 to browse or purchase one or more items 121 for sale. This request may represent, for example, a request by a user to browse or search a merchant's online catalog for one or more items to purchase. The request is processed by the electronic commerce application 113 and information related to one or more items 121 is returned to the client application 133 executing in the client computing device 106. The results are used by the client application 133 to render a user interface 200 on the display 131 of the client computing device 106.

Optionally, an additional request to login to the electronic commerce application using credentials associated with a user account 119 may be sent across the network 109 by the client application 133 executing on the client computing device 106 to the electronic commerce application 113 executing within the computing environment 103. Doing so permits the electronic commerce application 113 to provide customized content or recommend specific items based on information associated with the user account 119. Doing so also permits a user associated with the user account 119 to make use of additional features associated with the aggregated shopping cart 126. Such features may include saving an aggregated shopping cart 126 between visits or uses of the electronic commerce application 113. Alternatively, logging in permits a user associated with the user account 119 to share an aggregated shopping cart 126 with other user accounts 119.

As a part of the user interface 200 associated with the electronic commerce application 113, a user may add one or more items 121 to an aggregated shopping cart 126. The management of the aggregated shopping cart 126 is handled by the purchase electronic commerce application 113. The electronic commerce application 113 tracks the user accounts 119, the items 121, and the permissions 129 associated with each aggregated shopping cart 126.

After one or more items 121 have been have been added to the aggregated shopping cart 126, a user may choose to share the aggregated shopping cart 126 with other user accounts 119. As a general principal, sharing an aggregated shopping cart 126 with one or more additional user accounts 119 grants access to the aggregated shopping cart to the additional user accounts 119 and any users associated with those user accounts 119. However, permissions 129 may be set on an aggregated shopping cart 126 limiting the nature and type of access any particular user account 119 may have to the aggregated shopping cart. For example, permissions 129 may permit or deny a user account 119 from adding or removing additional items 119 to or from the aggregated shopping cart 126. Alternatively, permissions may permit a user associated with a user account 119 to share the aggregated shopping cart 126 with additional user accounts 119.

Once an aggregated shopping cart 126 has been shared with additional user accounts 119, the electronic commerce application sends a notification across the network 109 to one or more client computing devices 106 associated with the additional user accounts 119. Such notification may constitute an email, SMS message, or other notice. Alternatively, the electronic commerce application 113 may wait until a request is received from a client computing device 106 associated with the additional user accounts 119. In this alternative embodiment, a notification is rendered by the client application 133 on the display 131 as part of the user interface 200.

The user with whom the aggregated shopping cart 126 has been shared may then access the aggregated shopping cart 126 by sending a request to view the aggregated shopping cart 126 to the electronic commerce application 113. Such requests may be sent from the client computing device 106 of the recipient user. The electronic commerce application 113 then response to the request with information about the aggregated shopping cart. The client application 133 then renders the aggregated shopping cart on the display 131 as a portion of the user interface 200 for the client application 133.

The users of the electronic commerce application 113 may access the aggregated shopping cart as described herein. FIGS. 2A-2E represent a series of depictions of user interface 200 according to various embodiments of the present disclosure. Each of the figures corresponds to one of the events or use cases described above.

Figure 2A:
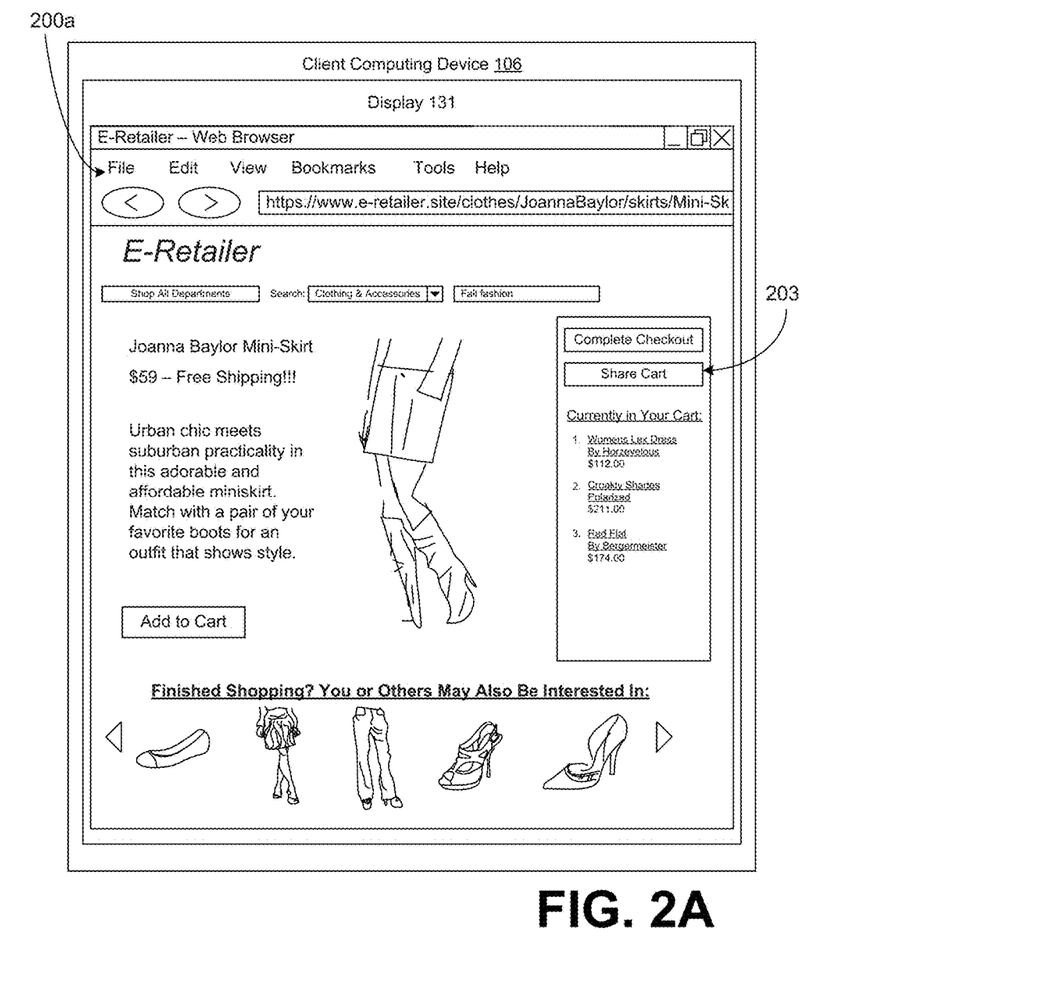
FIGS. 2A-2E are drawings of an example of a user interface rendered by a client in the networked environment of FIG. 1 according to various embodiments of the present disclosure.

Referring next to FIG. 2A, shown is an example of a user interface 200, denoted herein as user interface 200a, according to various embodiments. In this particular embodiment, user interface 200a is generated by a client application 133 (FIG. 1) displaying a network page on a display 131. The client application 133 presents a user interface 200a for interacting with the electronic commerce application 113 (FIG. 1). As part of the user interface 200a, a shopping cart frame 203 is presented representing an aggregated shopping cart 126 (FIG. 1). The shopping cart frame is rendered by the client application 133 using data provided by the electronic commerce application 113.

With regard to FIG. 2A, it is assumed that a user associated with a user account 119 has browsed the network page associated with the electronic commerce application 113 and added several items 121 to the aggregated shopping cart 126. As a user continues to browse the network page represented by the user interface 200a, the user has the option to add additional items 121 to the aggregated shopping cart 126. Alternatively, the user has the option to finish shopping and proceed to the checkout process and purchase the items 121 previously added to the aggregated shopping cart 126. However, the user may also interact with the shopping cart frame 203 to share the aggregated shopping cart 126 with additional user accounts 119.

Figure 2B:
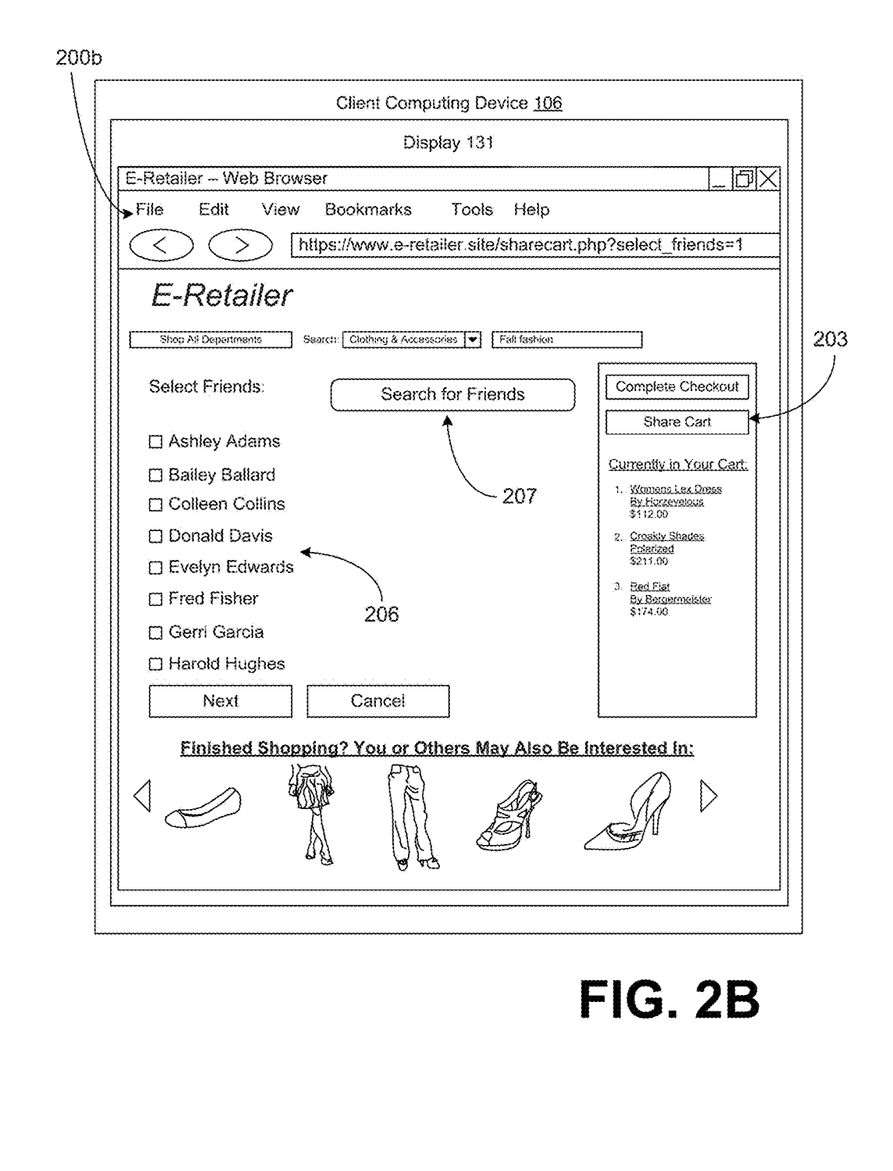

Turning now to FIG. 2B, shown is an example of a user interface 200, denoted herein as user interface 200b, according to various embodiments. Here, the initial user has chosen to share the aggregated shopping cart 126 (FIG. 1) with other user accounts 119 (FIG. 1). The electronic commerce application 113 (FIG. 1) has queried the data store 111 (FIG. 1) to create a list of user accounts 206 with whom the user may choose to share the aggregated shopping cart 126.

The list of user accounts 206 may be generated by any one of several approaches. The list of user accounts 206 may be created from a list based off of a social network. Such social network may comprise integration with a social network service such as FaceBook®, Google+®, Twitter®, LinkedIn®, MySpace® or similar social network services. Alternatively, the social network may comprise a proprietary or application specific social network where user accounts 119 may be associated with other user accounts 119.

The list of user accounts 206 may also be generated based on suggested matches. For example, users may be suggested because information associated with the user accounts 119 indicates one or more users live at the same address or live on the same street or in the same neighborhood.

In another embodiment, user accounts may be manually added to the list of user accounts 206. For example, names or email addresses associated with user accounts 119 may be manually entered in order to share the aggregated shopping cart with specific users. In other embodiments, users may use the search button 207 to manually search for and include one or more user accounts 119 corresponding to friends, relatives, and other users.

Figure 2C:
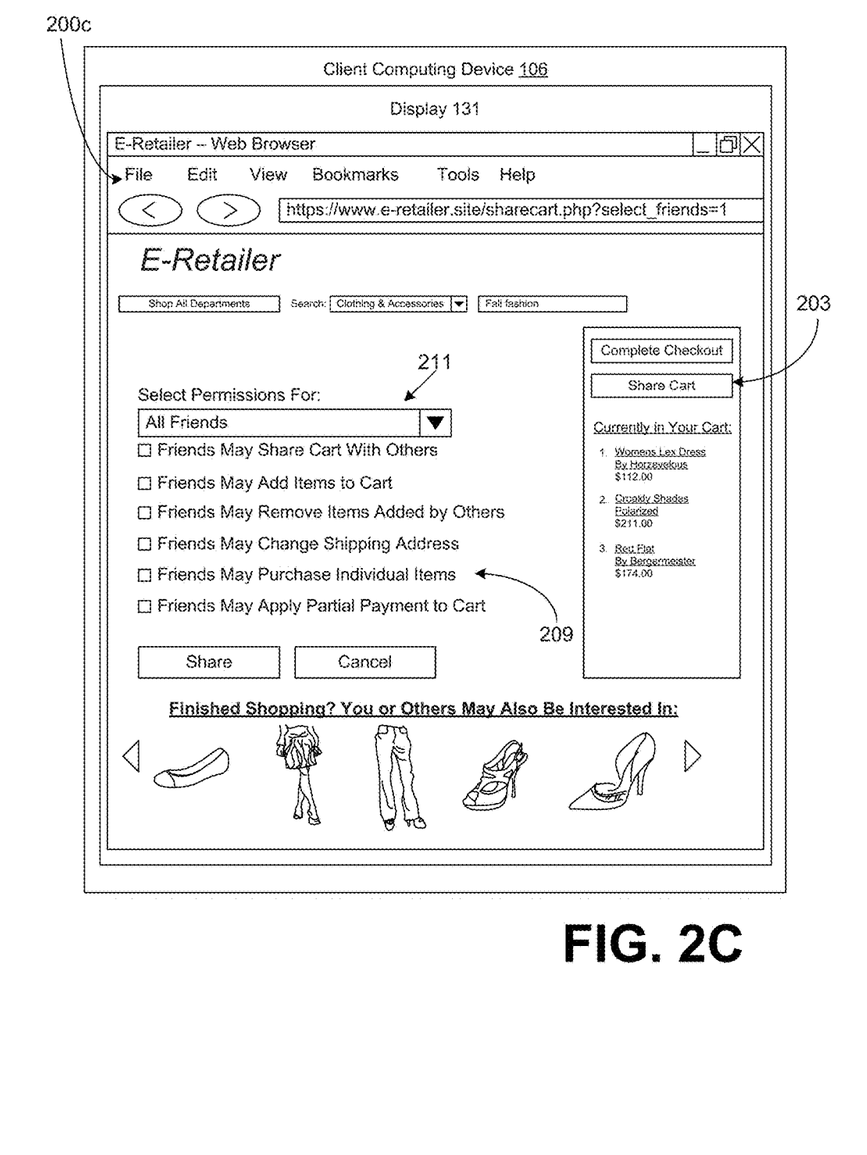

Moving on to FIG. 2C, shown is an example of a user interface 200, denoted herein as user interface 200c, according to various embodiments. Here, a user may set or select one or more permissions 129 (FIG. 1) from a list of permissions 209. The permissions grant or deny users associated with other user accounts 119 the ability to take certain actions with respect to the aggregated shopping cart 126 (FIG. 1). For example, users may be granted a permission 129 to share the cart with additional users. Users may also be granted a permission 129 to add or remove items from the aggregated shopping cart 126. Further, users may be granted a permission 129 to remove items added by others to the aggregated shopping cart 126. Users may also be granted a permission 129 to purchase individual items 121 (FIG. 1) from the aggregated shopping cart 126.

Permissions 129 may be cumulative or mutually exclusive according to various embodiments of the present disclosure, and the user interface 200c will further reflect that fact and indicate such information to the user. For example, a user may be able to select or deselect cumulative permissions 129 by checking or unchecking boxes. With regard to mutually exclusive permissions 129, a user may be able to select one from a set using a radio box.

Further, the user interface 200c may be configured to set permissions 129 on a per user account 119 basis or apply permissions 129 to all user accounts 119 or a group of user accounts 119 with which the cart is shared. For example, a drop down box 211 may allow the specification of user accounts 119 to which permissions 129 will apply. It is understood that other methods exist in the art to convey similar information to a user and obtain similar user selections.

Figure 2D:
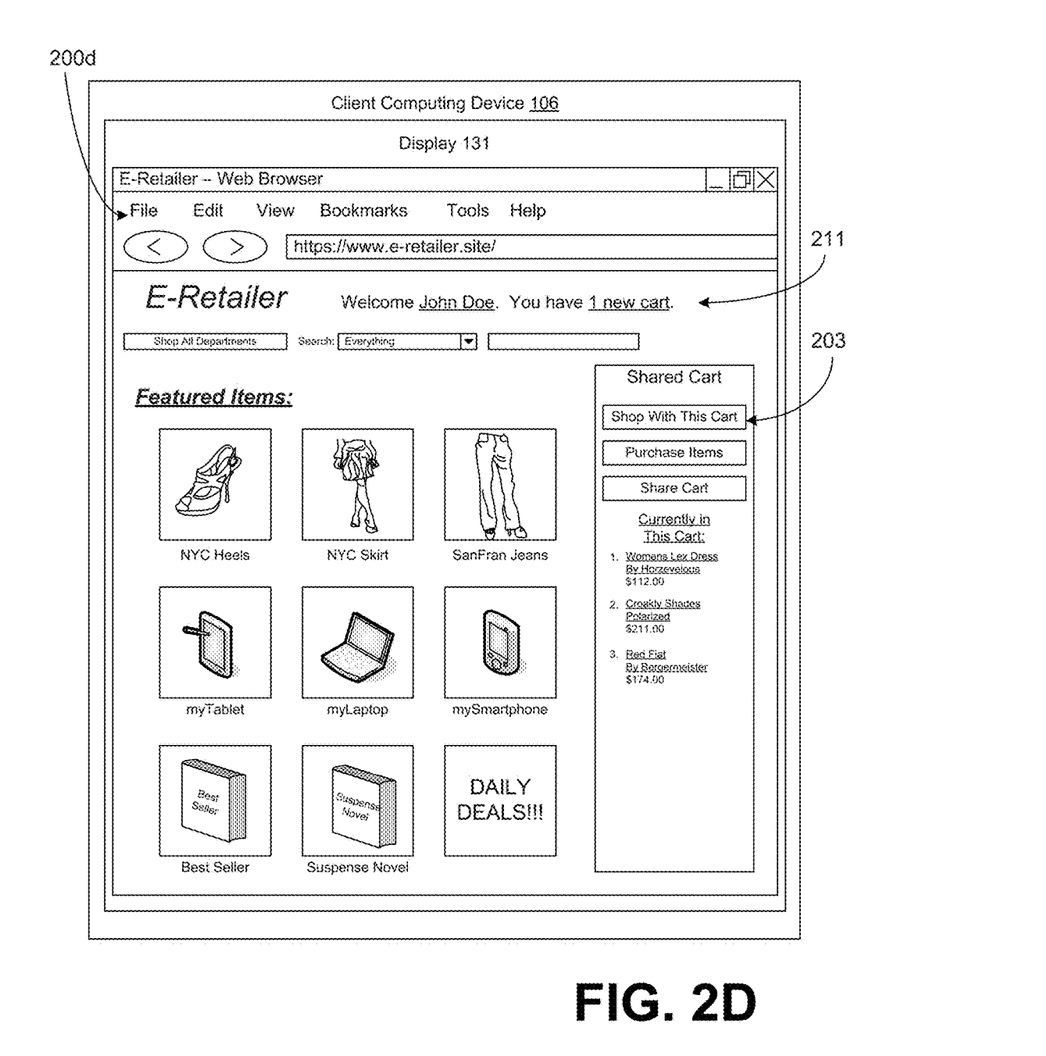

Referring next to FIG. 2D, shown is an example of a user interface 200, denoted herein as user interface 200d, according to various embodiments. Here, a first user associated with another user account 119 (FIG. 1) has created an aggregated shopping cart 126 (FIG. 1) and shared the aggregated shopping cart 126 with a second user. The user of the client application 133 (FIG. 1) executing on the client computing device 106 is notified by the notification bar 211 rendered as a portion of the user interface 200d that another user account has shared an aggregated shopping cart with the user. The contents of the shared aggregated shopping cart are displayed in the shopping cart frame 203. The user may choose to purchase items from or contribute payment to the purchase of the items in the aggregated shopping cart 126. Alternatively, the user may share the cart with additional users or continue shopping with the aggregated shopping cart 126 and add additional items to it.

Figure 2E:
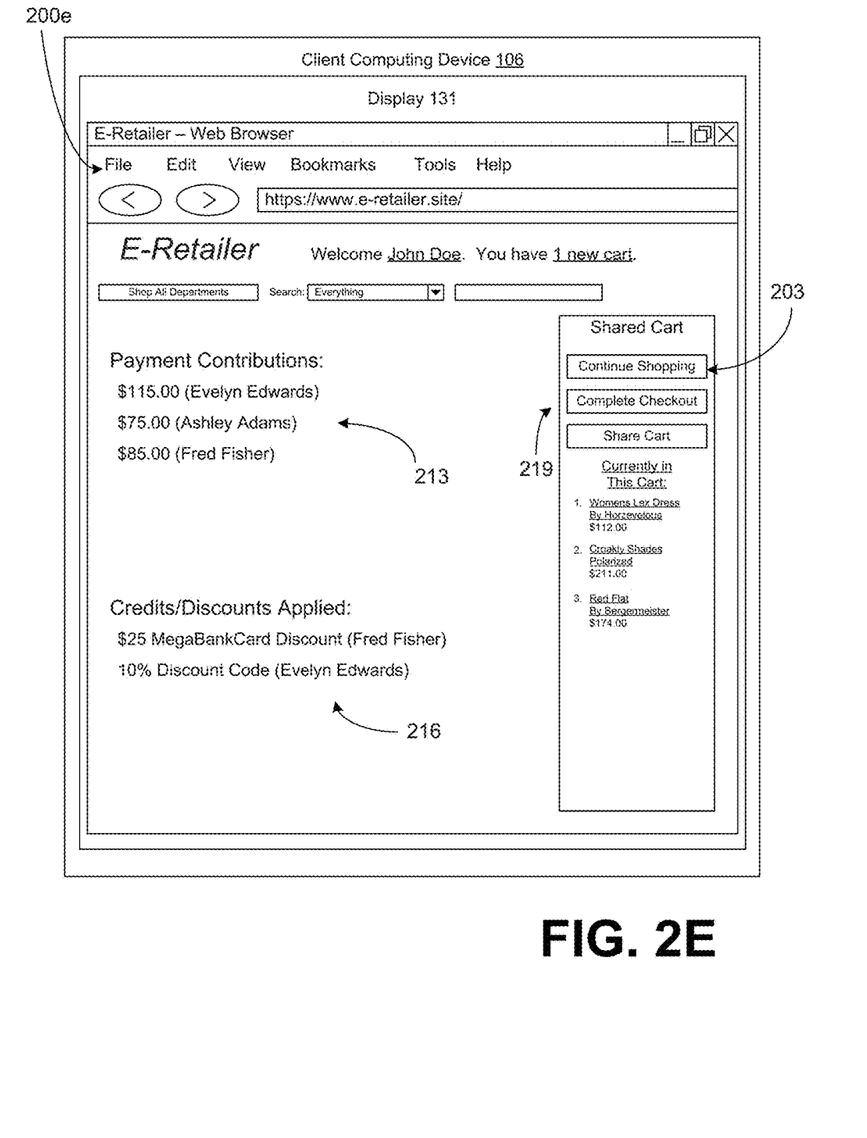

Moving to FIG. 2E, shown is an example of a user interface 200, denoted herein as user interface 200e, according to various embodiments. Here, a user associated with a user account 119 (FIG. 1) is viewing purchase instrument data 123 (FIG. 1) represented by a list of purchase instruments 213 associated with the aggregated shopping cart 126 (FIG. 1) represented by the shopping cart frame 203. Also shown is a list of discounts 216 applied to the aggregated shopping cart contributed by one or more users with whom the aggregated shopping cart 126 has been shared.

In this particular embodiment of the present disclosure, a number of users associated with user accounts 119 have made a number of contributions towards the total purchase price. Similarly, a number of discounts have been applied to the order. It is understood that some discounts may be applied only because a particular user is involved with the transaction. For example, a particular individual may have access to a promotion that other customers associated with the order do not.

Once a combination of discounts or other promotions and contributions have been contributed towards the total purchase price, any user associated with a user account 119 granted a permission 129 for completing the checkout process may do so by clicking on the complete checkout button 219. During the checkout process, the electronic commerce application 113 may request that shipping information, such as shipping service or the shipping address, be provided. The electronic commerce application 113 may further request that order, billing, payment information be confirmed. Last minute modifications to the aggregated shopping cart 126 may also be permitted. For example, items 121 may be added, removed, or substituted, or shipping addresses may be changed.

During the checkout process, access to the aggregated shopping cart 126 may be locked for the duration of the checkout. For example, items 121 may not be permitted to be added by user accounts 119 other than the user account 119 associated with the checkout process. Such a lock prevents race conditions where the type and quantity of items 121 ordered changes as payment is being finalized and shipping times and costs are being estimated.

Alternatively, the lock may last for a predetermined period of time beginning with the initiation of the checkout process. By ending the lock after the passage of a predetermined period of time, the lock is prevented from permanently blocking user accounts 119 from accessing or interacting with the aggregated shopping cart 126. For example, if a user account 119 stops half-way through the checkout process, other user accounts 119 may have to wait for an indefinite period until the checkout process is resumed. Alternatively, application crashes during the checkout process could leave the aggregated shopping cart 126 permanently locked. These and similar situations are avoided by associating a predetermined time limit with the lock.

It is further understood that locks may also be used in some embodiments of the present disclosure to coordinate changes to the aggregated shopping cart 126 outside of the checkout process. As a non-limiting example, certain updates before the checkout process, such as contributing a partial or full payment towards at least one item, may require a lock in order to prevent overpayment for one or more users.

Figure 3:
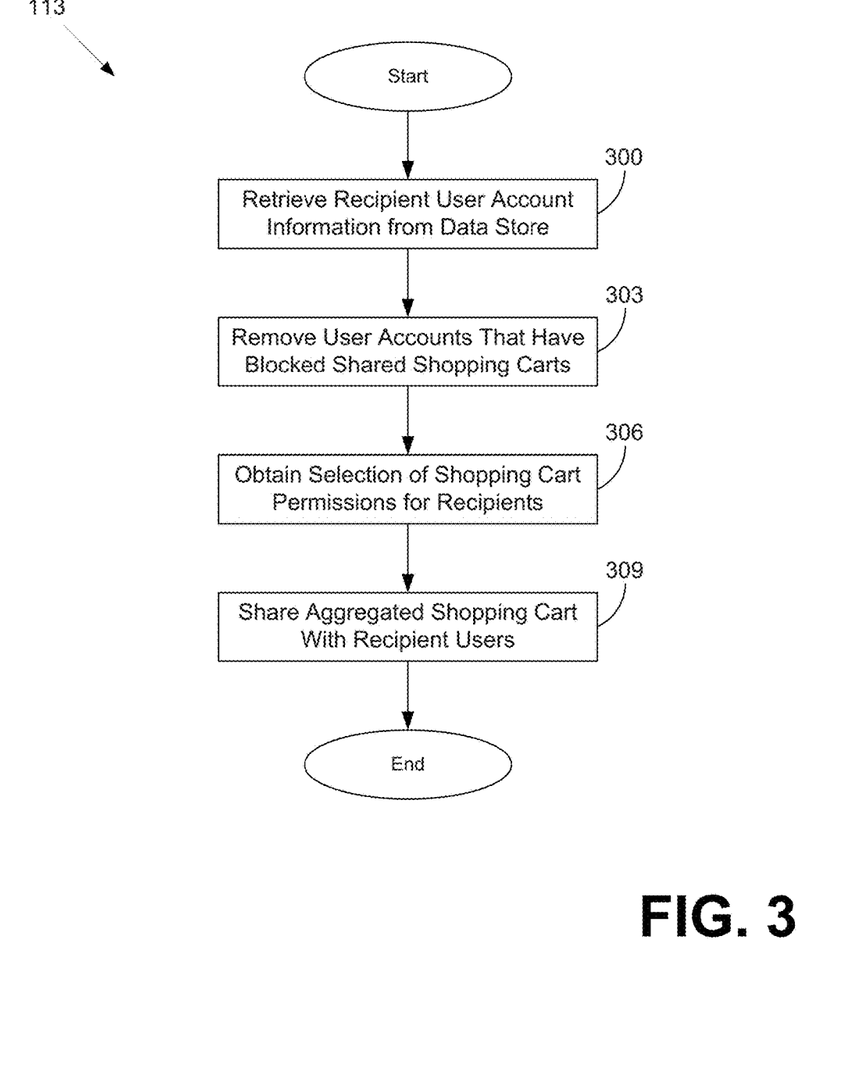
FIG. 3 is a flowchart illustrating one example of functionality implemented as portions of the electronic commerce application executed in a computing environment in the networked environment of FIG. 1 according to various embodiments of the present disclosure.

Turning now to FIG. 3, shown is a flowchart that provides one example of the operation of a portion of the electronic commerce application 113 (FIG. 1) according to various embodiments. It is understood that the flowchart of FIG. 3 provides merely an example of the many different types of functional arrangements that may be employed to implement the operation of the portion of the electronic commerce application 113 as described herein. As an alternative, the flowchart of FIG. 3 may be viewed as depicting an example of steps of a method implemented in the computing environment 103 (FIG. 1) according to one or more embodiments.

More specifically, the flowchart represented by FIG. 3 illustrates the plurality of steps or actions functionally implemented by the electronic commerce application 113 in response to receiving a request by a user to share the aggregated shopping cart 126 (FIG. 1) with one or more additional users. For the purposes of discussing the flowchart represented by FIG. 3, it is assumed that a user has chosen to share the aggregated shopping cart 126 with one or more additional user accounts 119 (FIG. 1) and that the user has selected the user accounts 119 with which to share the aggregated shopping cart 126.

Beginning with box 300, the electronic commerce application 113 retrieves information associated with each user account 119 that is indicated as having access to the aggregated shopping cart 126.

Proceeding to box 303, the electronic commerce application 113 analyzes preferences associated with each recipient user account 119. If preference for a user account 119 indicates that the user account 119 does not desire to share aggregated shopping carts 126, then the user account 119 is removed from the list. Such a preference may be a blanket or universal preference that aggregated shopping carts should never be shared with the user account 119. Alternatively, the preference may be set on a per user basis, where some user accounts 119 may share an aggregated shopping cart 126 with the recipient user account 119, but other user accounts 119 are blocked from sharing an aggregated shopping cart 126 with the recipient use account. Allowing such preferences to be set, allows for users to avoid their user account 119 receiving unwanted aggregated shopping carts 126 (i.e. "spam carts").

Moving to box 306, the electronic commerce application 113 obtains a selection of permissions 129 (FIG. 1) from the user to assign to the aggregated shopping cart 126. Permissions may be applied individually to user accounts 119 or to groups or classes of user accounts 119. Such permissions limit actions that a user associated with a user account 119 may perform on an aggregated shopping cart 126 that has been assigned to the user account 119. Possible permissions include the ability to share the aggregated shopping cart 126 with other user accounts 119; the ability to add or remove items 121 from the aggregated shopping cart 126; the ability to remove items 121 added by others; the ability to change the shipping address for individual items 121 or for the entire order; the ability to pay for individual items 121 within the aggregated shopping cart 126; the ability to pay for the order in full or to contribute a partial payment towards the total purchase price; and other similar permissions.

The assignment of permissions 129 to the aggregated shopping cart 126 allows the aggregated shopping cart 126 to be employed in many different situations. For example, permissions 129 related to split payment or partial payment allows multiple users to aggregate their purchases into a single order. Such an aggregated order may permit bulk discounts that no single user could qualify for individually. Alternatively, individual users could apply coupon codes, promotions or other credits or discounts to a shared order for the benefit of all, while only paying for individual items 121 within an order. A limitation on who can share an aggregated shopping cart 126 with other user accounts 119 allows users to keep shared orders to a manageable size. Limitations on who can add items 121, remove items 121, or change the shipping address associated with items 121 or the order helps prevent fraud and theft.

Finally, in box 309, the electronic commerce application 113 (FIG. 1) shares the aggregated shopping cart 126 with the recipient user accounts 119. Here, users associated with recipient user accounts 119 are granted access to the aggregated shopping cart 126 subject to any permissions 129. Once the aggregated shopping cart 126 is available, notifications are sent to the users associated with the recipient user accounts 119. Notifications may include emails or SMS messages alerting users associated with the recipient user accounts 119 that an aggregated shopping cart is available. Alternatively, when a user logs into the electronic commerce application 113 with their user account 119, a notification may be rendered within the user interface 200*d* (FIG. 2D).

Other methods of notification are also possible, and a user account 119 may also include preferred methods for receiving notifications.

Figure 4:
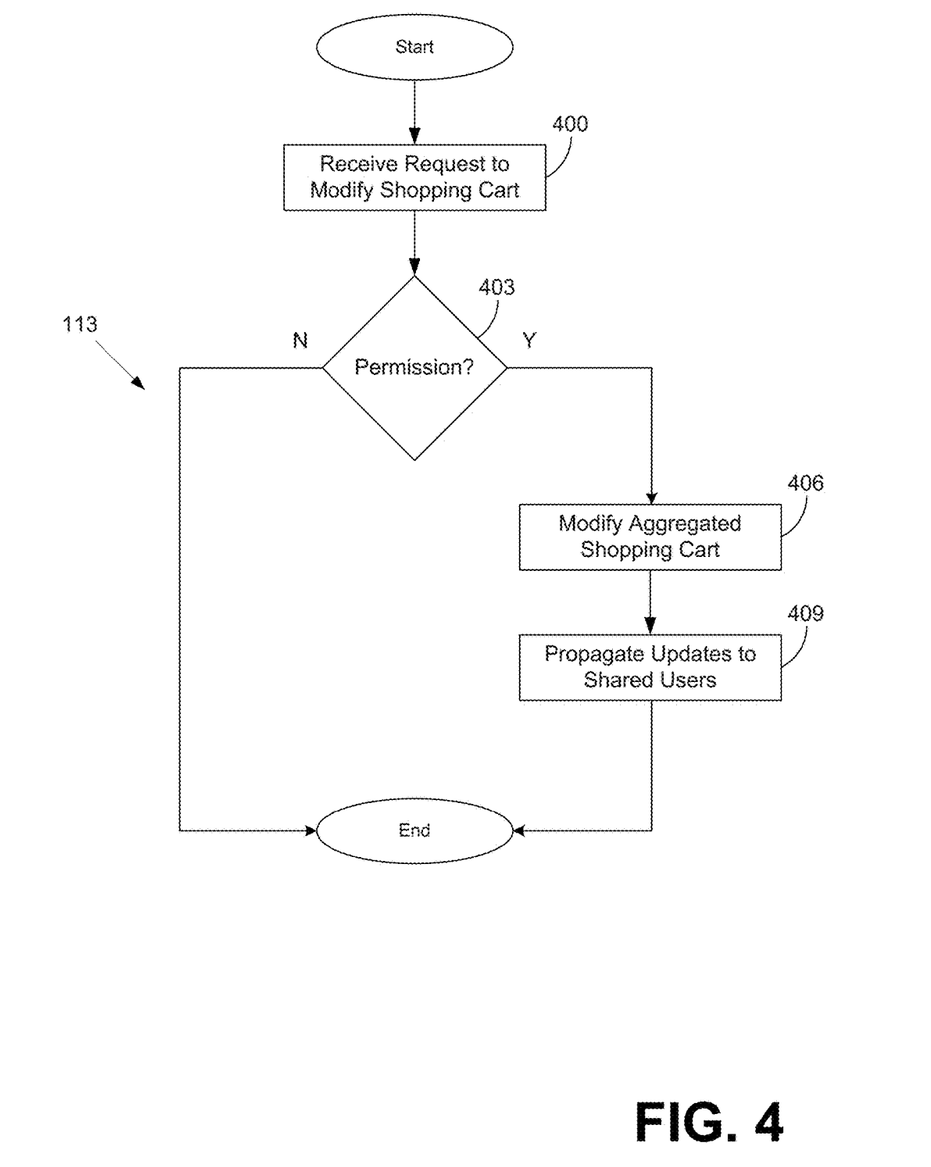
FIG. 4 is a flowchart illustrating another example of additional functionality implemented as portions of the electronic commerce application executed in a computing environment in the networked environment of FIG. 1 according to various embodiments of the present disclosure.

Moving on to FIG. 4, shown is a flowchart that provides one example of the operation of a portion of the electronic commerce application 113 (FIG. 1) according to various embodiments. It is understood that the flowchart of FIG. 4 provides merely an example of the many different types of functional arrangements that may be employed to implement the operation of the portion of the electronic commerce application 113 as described herein. As an alternative, the flowchart of FIG. 4 may be viewed as depicting an example of steps of a method implemented in the computing environment 103 (FIG. 1) according to one or more embodiments.

More specifically, the flowchart represented by FIG. 4 illustrates the plurality of steps or actions performed by the electronic commerce application 113 in response to receiving a request to modify the aggregated shopping cart 126 (FIG. 1) from a user with whom the aggregated shopping cart has been shared. For example, a user may wish to add or remove items from an aggregated shopping cart. For the purposes of discussing the flowchart represented by FIG. 4, it is assumed that an aggregated shopping cart 126 has already been created by a user and shared with at least one user account 119 (FIG. 1).

Beginning with box 400, a modification request is received from a user associated with a user account 119 that has access to the aggregated shopping cart 126. The request is sent from a client application 133 (FIG. 1) executing on a client computing device 106 (FIG. 1) across a network 109 (FIG. 1) to the computing environment 103. The request may comprise a request to modify any aspect of the aggregated shopping cart. Example requests include requests to add or remove items 121, share the aggregated shopping cart 126 with additional user accounts 119 or similar requests.

In several embodiments of the present disclosure, the electronic commerce application 113 may check to determine if the aggregated shopping cart is currently locked. For example, the cart may be locked because it is in the checkout process or another user is viewing or modifying the aggregated shopping cart 126. In response to determining that the aggregated shopping cart 126 is locked, the electronic commerce application 113 may wait for the lock to be released. Alternatively, in response to determining that the aggregated shopping cart 126 is locked, the electronic commerce application 113 may respond with a notification that the aggregated shopping cart 126 is locked. Some embodiments of the present disclosure may further disclosed in the notification the user account 119 which has the lock.

Moving on to box 403, the electronic commerce application 113 checks the permissions 129 (FIG. 1) of the aggregated shopping cart 126 to confirm that user associated with the user account 119 is permitted to modify the aggregated shopping cart 126 in the desired manner. If the user account 119 does not have the necessary permissions 129 to modify the aggregated shopping cart, 126, then the request to modify is rejected and execution ends. If the appropriate permissions 129 have been assigned to the user account 119 associated with the modification request, then execution proceeds to box 406.

Moving on to box 406, the aggregated shopping cart 126 is modified as requested. A confirmation is sent from the electronic commerce application 113 executing within the computing environment 103 back across the network to the client application 133 executing on the client computing device 106. Such confirmation may be conveyed in any one of a number of ways. For example, confirmation may be conveyed by updating a section or portion of a network page rendered on the display 131 (FIG. 1) of the client computing device. Confirmation may be sent in a message such as an email or SMS message. It is understood that a user may be notified by other methods and that multiple methods may be used in conjunction with each other.

Proceeding to box 409, the modifications made to the aggregated shopping cart 126 are propagated to other user accounts 119 with which the aggregated shopping cart is shared. While the changes to the aggregated shopping cart 126 may occur instantaneously in the data store 111, these changes must be relayed to the users. For example, a user currently logged in to his or her user account 119 associated with the electronic commerce application may see the shopping cart frame 203 (FIG. 2) update automatically. Once the changes have propagated, execution ends.

Figure 5:
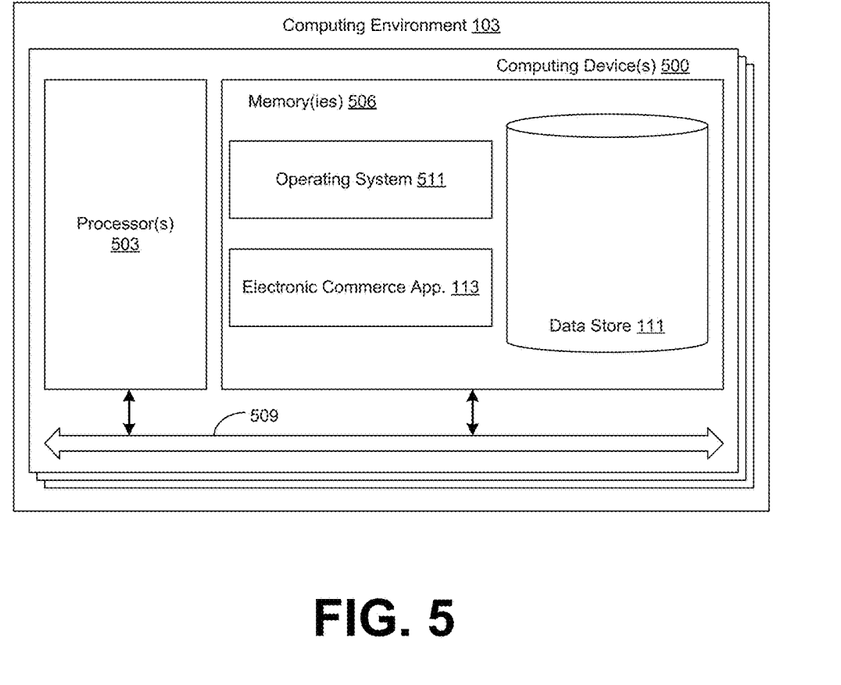
FIG. 5 is a schematic block diagram that provides one example illustration of a computing environment employed in the networked environment of FIG. 1 according to various embodiments of the present disclosure.

With reference to FIG. 5, shown is a schematic block diagram of the computing environment 103 according to an embodiment of the present disclosure. The computing environment 103 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the electronic commerce application 113 and potentially other applications. Also stored in the memory 506 may be a data store 111 and other data. In addition, an operating system 511 may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the electronic commerce application, the purchase aggregator, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the electronic commerce application 113. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 113, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program comprising machine readable instructions executable in at least one computing device, wherein the machine readable instructions, when executed, cause the at least one computing device to at least:
create an aggregated shopping cart associated with an electronic commerce system in response to a request received from a first user associated with a first user account;
permit the first user associated with the first user account to modify the aggregated shopping cart;

generate a search user interface, wherein the search user interface is configured to receive a search request for a second user account with which to share the aggregated shopping cart;
cause the search user interface to be transmitted to a first client device associated with the first user;
search for the second user account with which to share the aggregated shopping cart in response to receiving the search request via the search user interface;
permit the first user associated with the first user account or a second user associated with the second user account to purchase at least one item in the aggregated shopping cart;
accept a plurality of partial payments toward a purchase of at least one item within the aggregated shopping cart;
permit the second user associated with the second user account to modify the aggregated shopping cart in response to the aggregated shopping cart being shared with the second user account;
permit the first user associated with the first user account to limit an ability of the second user associated with the second user account to modify the aggregated shopping cart;
permit the second user associated with the second user account to share the aggregated shopping cart with a third user account;
permit a third user associated with the third user account to modify the aggregated shopping cart in response to the aggregated shopping cart being shared with the third user account;
permit the third user associated with the third user account to contribute toward the purchase of the at least one item in the aggregated shopping cart;
permit the second user associated with the second user account to block the first user associated with the first user account from sharing the aggregated shopping cart with the second user associated with the second user account;
generate a permissions user interface configured to receive a plurality of permissions from the first client device associated with the first user, individual ones of the plurality of permissions controlling whether the second user is permitted to take a single respective action with respect to the aggregated shopping cart;
cause the permissions user interface to be transmitted to the first client device associated with the first user;
apply a predetermined discount to a purchase price associated with the aggregated shopping cart; and
generate a payment user interface configured to display the predetermined discount.

2. A system, comprising
a computing device; and
an application executable in the computing device, the application comprising machine readable instructions that, when executed by the computing device, cause the computing device to at least:
create an aggregated shopping cart associated with an electronic commerce system in response to a request received from a first user associated with a first user account;
permit the first user associated with the first user account to modify the aggregated shopping cart;
generate a search user interface, wherein the search user interface is configured to receive a search request for a second user account with which to share the aggregated shopping cart;
cause the search user interface to be transmitted to a first client device associated with the first user;
search for the second user account with which to share the aggregated shopping cart in response to receiving the search request via the search user interface;
determine that the first user associated with the first user account is permitted to share the aggregated shopping cart with the second user account based at least on a determination that the second user associated with the second user account has not blocked the first user associated with the first user account from sharing the aggregated shopping cart with the second user associated with the second user account;
receive, on behalf of the second account, a share request from the first user account to share the aggregated shopping cart with the second user associated with the second user;
conditionally grant the share request based at least in part on a share preference associated with the second account;
generate a permissions user interface configured to receive a selection of a permission from a plurality of mutually exclusive permissions from the first client device associated with the first user;
cause the permissions user interface to be transmitted to the first client device associated with the first user; and
permit a second user associated with the second user account to contribute to a purchase of at least one item in the aggregated shopping cart based at least in part on the permission received via the permissions user interface.

3. The system of claim 2, wherein the application further causes the computing device to at least accept a plurality of partial payments from at least one payment instrument toward the purchase of the at least one item within the aggregated shopping cart.

4. The system of claim 2, wherein the application further causes the computing device to at least permit the second user associated with the second user account to modify the aggregated shopping cart in response to the aggregated shopping cart being shared with the second user account based at least in part on the permission received via the permissions user interface.

5. The system of claim 4, wherein the application further causes the computing device to at least receive a limitation of an ability of the second user associated with the second user account to modify the aggregated shopping cart from the first user associated with the first user account via the permissions user interface.

6. The system of claim 4, wherein the application further causes the computing device to at least receive a limitation of an ability of the second user associated with the second user account to modify individual items within the aggregated shopping cart from the first user associated with the first user account via the permissions user interface.

7. The system of claim 2, wherein the application further causes the computing device to at least:
permit the second user associated with the second user account to share the aggregated shopping cart with a third user account;
permit a third user associated with the third user account to modify the aggregated shopping cart after the aggregated shopping cart has been shared with the third user account; and
permit the third user associated with the third user account to contribute to the purchase of the at least one item in the aggregated shopping cart based at least in part on permission received via the permissions user interface.

8. The system of claim 2, wherein the application further causes the computing device to permit the second user associated with the second user account to block the first user associated with the first user account from sharing the aggregated shopping cart with the second user associated with the second user account.

9. A method, comprising:
creating, via at least one of one or more computing devices, an aggregated shopping cart associated with an electronic commerce system in response to a request received from a first user associated with a first user account;
modifying, via at least one of the one or more computing devices, the aggregated shopping cart in response to receiving a first modification request from the first user associated with the first user account;
generating, via at least one of the one or more computing devices, a search user interface configured to receive a search request for a second user account with which to share the aggregated shopping cart;
causing, via at least one of the one or more computing devices, the search user interface to be transmitted to a first client device associated with the first user;
searching, via at least one of the one or more computing devices, for the second user account associated with a second user in response to receiving the search request via the search user interface;
sharing, via at least one of the one or more computing devices, the aggregated shopping cart with the second user account in response to receiving a first request to share from the first user associated with the first user account;
generating, via at least one of the one or more computing devices, a suggested share recipient user interface, including a group of suggested share recipients, based at least in part on a commonality between an address associated with the first user account and respective addresses associated with individual ones of the plurality of suggested share recipients;
causing, via at least one of the one or more computing devices, the suggested share recipient user interface to be transmitted to a first client device associated with the first user;
determining, via at least one of the one or more computing devices, that the first user associated with the first user account is permitted to share the aggregated shopping cart with the second user account, the determining comprising at least determining that the second user associated with the second user account has not blocked the first user associated with the first user account from sharing the aggregated shopping cart with the second user associated with the second user account;
permitting, via at least one of the one or more computing devices, the first user associated with the first user account to share the aggregated shopping cart with the second user account in response to receiving, via the user interface, an indication of the second user account as a share recipient;
generating, via at least one of the one or more computing devices, a permissions user interface configured to receive a plurality of permissions from the first client device associated with the first user;
causing, via at least one of the one or more computing devices, the permissions user interface to be transmitted to the first client device associated with the first user; and
accepting a payment, via at least one of the one or more computing devices, toward a purchase of at least one item in the aggregated shopping cart from the second user account associated with the second user based at least in part on at least one of the plurality of permissions specified by the first user associated with the first user account via the permissions user interface.

10. The method of claim 9, further comprising accepting, via at least one of the one or more computing devices, a plurality of partial payments from a plurality of payment instruments toward the purchase of the at least one item in the aggregated shopping cart.

11. The method of claim 9, further comprising modifying, via at least one of the one or more computing devices, the aggregated shopping cart in response to receiving a second modification request from the second user associated with the second user account in response to the aggregated shopping cart being shared with the second user account.

12. The non-transitory computer-readable medium of claim 1, wherein a particular permission of the plurality of permissions controls whether the second user is permitted to change a shipping address associated with the aggregated shopping cart.

13. The non-transitory computer-readable medium of claim 1, wherein a particular permission of the plurality of permissions controls whether the second user is permitted to invite a third user associated with a third user account to share the aggregated shopping cart.

14. The non-transitory computer-readable medium of claim 1, wherein a particular permission of the plurality of permissions controls whether the second user is permitted to change a shipping address associated with a particular item in the aggregated shopping cart.

15. The non-transitory computer-readable medium of claim 1, wherein a particular permission of the plurality of permissions controls whether the second user is permitted to remove a particular item from the aggregated shopping cart.

16. The system of claim 2, wherein the application further causes the computing device to at least:
deny the share request from the first user account based at least in part on the first user account being listed in the share preference; and
grant the share request from the first user account based at least in part on the first user account being absent from the share preference.

17. The system of claim 2, wherein the share preference operates to grant the share request regardless of an identity of the first user.

18. The system of claim 2, wherein the share preference operates to deny the share request regardless of an identity of the first user.

19. The non-transitory computer-readable medium of claim 1, wherein the plurality of permissions comprises at least three permissions, wherein the permissions user interface is further configured to display the at least three permissions in a list.

20. The non-transitory computer-readable medium of claim 19, wherein the permissions user interface is further configured to receive the at least three permissions by the first user checking boxes associated with the at least three permissions.

* * * * *